(12) United States Patent
Liu et al.

(10) Patent No.: US 11,500,490 B2
(45) Date of Patent: Nov. 15, 2022

(54) TOUCH PANEL, FABRICATING METHOD THEREOF AND DISPLAY DEVICE (71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Jianfeng Liu, Beijing (CN); Ni Yang, Beijing (CN); Xuefang Chen, Beijing (CN); Qi Hu, Beijing (CN); Qi Zhao, Beijing (CN)

(73) Assignees: CHONGQING BOE OPTOELECTRONICS TECHNOLOGY CO., LTD, Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 51 days.

(21) Appl. No.: 17/044,034

(22) PCT Filed: Apr. 16, 2020

(86) PCT No.: PCT/CN2020/085079
§ 371 (c)(1),
(2) Date: Sep. 30, 2020

(87) PCT Pub. No.: WO2020/211811
PCT Pub. Date: Oct. 22, 2020

(65) Prior Publication Data
US 2021/0365169 A1 Nov. 25, 2021

(30) Foreign Application Priority Data
Apr. 18, 2019 (CN) .................. CN201910314483

(51) Int. Cl.
G06F 3/041 (2006.01)
G06F 3/044 (2006.01)
(Continued)

(52) U.S. Cl.
CPC ........ *G06F 3/04166* (2019.05); *G06F 3/0446* (2019.05); *G06V 40/1306* (2022.01);
(Continued)

(58) Field of Classification Search
CPC combination set(s) only.
See application file for complete search history.

(56) References Cited

U.S. PATENT DOCUMENTS 6,401,551 B1 * 6/2002 Kawahara ............ G06K 9/0002
73/862.337
2016/0292487 A1 * 10/2016 Sun ...................... G06K 9/0002
(Continued)

FOREIGN PATENT DOCUMENTS

| CN | 103530609 A | 1/2014 |
|---|---|---|
| CN | 104063099 A | 9/2014 |

(Continued)

OTHER PUBLICATIONS

China Patent Office, Second Office Action regarding CN201910314483.5 dated Aug. 23, 2021.
(Continued)

*Primary Examiner* — Robin J Mishler
(74) *Attorney, Agent, or Firm* — Houtteman Law LLC (57) ABSTRACT There is provided a touch panel, including: a substrate including a touch detection area and a fingerprint recognition area; plural touch detection units in the touch detection area, each touch detection unit including a touch detection
(Continued)

electrode; plural fingerprint recognition units in the fingerprint recognition area, each fingerprint recognition unit including a fingerprint recognition electrode, and the fingerprint recognition electrode and the touch detection electrode being in a same layer; a signal wiring layer on a same side of the substrate as the touch detection electrode and the fingerprint recognition electrode and including plural first signal transmission lines and plural second signal transmission lines. The touch detection electrode is electrically coupled to and transmits a touch detection signal through a corresponding first signal transmission line, and the fingerprint recognition electrode is electrically coupled to and transmits a fingerprint recognition signal through a corresponding second signal transmission line.

18 Claims, 7 Drawing Sheets

(51) Int. Cl.
    *G09G 3/32*     (2016.01)
    *G06V 40/13*     (2022.01)
(52) U.S. Cl.
    CPC ..... *G09G 3/32* (2013.01); *G06F 2203/04103* (2013.01); *G06F 2203/04111* (2013.01)

(56) References Cited

U.S. PATENT DOCUMENTS

| | | | | |
|---|---|---|---|---|
| 2017/0293378 | A1* | 10/2017 | Ahn | G06F 3/0446 |
| 2019/0004663 | A1* | 1/2019 | Li | G06F 3/0445 |
| 2019/0080133 | A1* | 3/2019 | Zhang | G06K 9/0002 |

FOREIGN PATENT DOCUMENTS

| | | | |
|---|---|---|---|
| CN | | 104155785 A | 11/2014 |
| CN | | 104699320 A | 6/2015 |
| CN | DN | 104699320 A | 6/2015 |
| CN | | 104850292 A | 8/2015 |
| CN | | 105159506 A | 12/2015 |
| CN | | 105183252 A | 12/2015 |
| CN | | 105741748 A | 7/2016 |
| CN | | 106201131 A | 12/2016 |
| CN | | 106383623 A | 2/2017 |
| CN | | 106775129 A | 5/2017 |
| CN | | 108509096 A | 9/2018 |
| CN | DN | 108509096 A | 9/2018 |
| CN | | 110032303 A | 7/2019 |

OTHER PUBLICATIONS

China Patent Office, First Office Action dated Mar. 3, 2021 issued in corresponding Chinese Application No. 201910314483.5.
China Patent Office, CN201910314483.5 Third Office Action dated Dec. 23, 2021.

* cited by examiner

TOUCH PANEL, FABRICATING METHOD THEREOF AND DISPLAY DEVICE

CROSS-REFERENCE TO RELATED APPLICATIONS

This is a National Phase Application filed under 35 U.S.C. 371 as a national stage of PCT/CN2020/085079 filed on Apr. 16, 2020, an application claiming priority from Chinese patent application No. 201910314483.5 filed on Apr. 18, 2019, the entirety of each of which is incorporated herein by reference.

TECHNICAL FIELD

The present disclosure relates to the field of touch technologies, in particular to a touch panel, a fabricating method thereof and a display device.

BACKGROUND

A touch screen and fingerprint recognition technologies have been widely used in mobile terminals such as mobile phones and tablet computers, and the use of touch screen and fingerprint recognition technologies significantly improves the user experience of human-computer interaction. At the same time, extremely narrow borders and even a full screen of a mobile terminal is the development direction. Display products including OLED devices are expected to realize not only flexible display but also integration of fingerprint recognition and touch functions in the case of the full screen. For example, touch screen technologies include an OGS (One Glass Solution) technology, an on-cell technology, an in-cell technology, and the like. For example, fingerprint recognition technologies include a capacitive fingerprint recognition technology, an ultrasonic fingerprint recognition technology, an optical fingerprint recognition technology, and the like.

More and more functional devices (fingerprint recognition devices, receivers, and the like) are integrated in a mobile terminal below the screen thereof. Generally, the implementation of fingerprint recognition (e.g., the capacitive fingerprint recognition) requires a separate fingerprint recognition device either below the screen or at the back side of the mobile terminal, which increases the width of the borders or thickness of the mobile terminal. In addition, the implementation of the ultrasonic fingerprint recognition and the optical fingerprint recognition also needs a separate sonic wave sending and echo recognition device and a reflected light sensing device, which increases the integration difficulty and cost of the mobile terminal.

SUMMARY

Embodiments of the present disclosure provide a touch panel including: a substrate including a touch detection area and a fingerprint recognition area; a plurality of touch detection units on the substrate and in the touch detection area, each touch detection unit including a touch detection electrode; a plurality of fingerprint recognition units on the substrate and in the fingerprint recognition area, each fingerprint recognition unit including a fingerprint recognition electrode, and the fingerprint recognition electrode and the touch detection electrode being in a same layer; a signal wiring layer on a same side of the substrate as the touch detection electrode and the fingerprint recognition electrode and including a plurality of first signal transmission lines and a plurality of second signal transmission lines. The touch detection electrode is electrically coupled to a corresponding first signal transmission line and transmits a touch detection signal through the corresponding first signal transmission line, and the fingerprint recognition electrode is electrically coupled to a corresponding second signal transmission line and transmits a fingerprint recognition signal through the corresponding second signal transmission line.

In some embodiments, the touch detection electrode in each of the plurality of touch detection units is a self-capacitive touch detection electrode; and the self-capacitive touch detection electrodes in the plurality of touch detection units are in one-to-one correspondence with the plurality of first signal transmission lines.

In some embodiments, the touch detection electrode in each of the plurality of touch detection units includes a first touch detection electrode and a second touch detection electrode; the first touch detection electrode includes a first sub-electrode and a second sub-electrode respectively on both sides of the second touch detection electrode, the first sub-electrode and the second sub-electrode are electrically coupled to each other through a bridge wire, and the bridge wire is insulated from the second touch detection electrode; and one of the first touch detection electrode and the second touch detection electrode is a mutual capacitive touch scanning electrode, and the other of the first touch detection electrode and the second touch detection electrode is a mutual capacitive touch sensing electrode.

In some embodiments, the plurality of touch detection units are arranged in an array, the mutual capacitive touch scanning electrodes in a same row are electrically coupled to each other, and the mutual capacitive touch sensing electrodes in a same column are electrically coupled to each other; the plurality of first signal transmission lines include a plurality of touch scanning signal transmission lines and a plurality of touch sensing signal transmission lines, the mutual capacitive touch scanning electrodes in the same row are electrically coupled to a same touch scanning signal transmission line, the mutual capacitive touch scanning electrodes in different rows are electrically coupled to different touch scanning signal transmission lines, the mutual capacitive touch sensing electrodes in the same column are electrically coupled to a same touch sensing signal transmission line, and the mutual capacitive touch sensing electrodes in different columns are electrically coupled to different touch sensing signal transmission lines.

In some embodiments, the bridge wire, the plurality of touch scanning signal transmission lines, and the plurality of touch sensing signal transmission lines are in a same layer.

In some embodiments, the fingerprint recognition electrode in each of the plurality of fingerprint recognition units is a self-capacitive fingerprint recognition electrode; and the self-capacitive fingerprint recognition electrodes in the plurality of fingerprint recognition units are in one-to-one correspondence with the plurality of second signal transmission lines.

In some embodiments, each fingerprint recognition unit further includes a switching transistor; in the fingerprint recognition unit, the fingerprint recognition electrode is electrically coupled to the corresponding second signal transmission line through the switching transistor, a gate of the switching transistor is coupled to a fingerprint scanning driving line corresponding to the fingerprint recognition electrode, a first electrode of the switching transistor is coupled to the second signal transmission line corresponding to the fingerprint recognition electrode, and a second electrode of the switching transistor is coupled to the fingerprint recognition electrode; and the plurality of fingerprint recognition units are arranged in an array, the fingerprint recognition electrodes in a same row correspond to a same fingerprint scanning driving line, the fingerprint recognition electrodes in different rows correspond to different fingerprint scanning driving lines, the fingerprint recognition electrodes in a same column correspond to a same second signal transmission line, and the fingerprint recognition electrodes in different columns correspond to different second signal transmission lines.

In some embodiments, the touch panel further includes a display function layer. The touch detection electrode, the fingerprint recognition electrode and the signal wiring layer are on a side of the display function layer proximal to the substrate; and the display function layer includes a plurality of gate lines, a plurality of data lines and a plurality of pixel units, each pixel unit corresponds to one gate line and one data line and includes a pixel driving circuit and a light emitting device, the pixel driving circuit is configured to drive the light emitting device to emit light, the pixel driving circuit includes a signal writing transistor, a gate of the signal writing transistor is coupled to the one gate line, and a first electrode of the signal writing transistor is coupled to the one data line.

In some embodiments, orthographic projections of the plurality of data lines on the signal wiring layer cover the plurality of first signal transmission lines and the plurality of second signal transmission lines.

In some embodiments, each fingerprint recognition unit further includes a switching transistor; in the fingerprint recognition unit, the fingerprint recognition electrode is electrically coupled to the corresponding second signal transmission line through the switching transistor, a gate of the switching transistor is coupled to a fingerprint scanning driving line corresponding to the fingerprint recognition electrode, a first electrode of the switching transistor is coupled to the second signal transmission line corresponding to the fingerprint recognition electrode, and a second electrode of the switching transistor is coupled to the fingerprint recognition electrode; the plurality of fingerprint recognition units are arranged in an array, the fingerprint recognition electrodes in a same row correspond to a same fingerprint scanning driving line, the fingerprint recognition electrodes in different rows correspond to different fingerprint scanning driving lines, the fingerprint recognition electrodes in a same column correspond to a same second signal transmission line, and the fingerprint recognition electrodes in different columns correspond to different second signal transmission lines; and the gate of the switching transistor and the gate of the signal writing transistor are in a same layer, an active layer of the switching transistor and an active layer of the signal writing transistor are in a same layer, and the first and second electrodes of the switching transistor and the first and second electrodes of the signal writing transistor are in a same layer.

In some embodiments, the fingerprint scanning driving lines corresponding to the fingerprint recognition electrodes of the plurality of fingerprint recognition units are implemented by at least a part of the plurality of gate lines.

In some embodiments, a planarization layer is disposed between the display function layer and the signal wiring layer.

In some embodiments, the light emitting device includes a current-driven light emitting device.

In some embodiments, the signal wiring layer is on a side of the layer where the touch detection electrode and the fingerprint recognition electrode are located distal to the substrate.

In some embodiments, a size of the touch detection electrode is larger than a size of the fingerprint recognition electrode.

Embodiments of the present disclosure also provide a method for fabricating a touch panel, including: providing a substrate, wherein the substrate includes a touch detection area and a fingerprint recognition area; forming a plurality of touch detection units on the substrate in the touch detection area, and forming a plurality of fingerprint recognition units on the substrate in the fingerprint recognition area, wherein each of the plurality of touch detection units includes a touch detection electrode, each of the plurality of fingerprint recognition units includes a fingerprint recognition electrode, and the fingerprint recognition electrode and the touch detection electrode are disposed in a same layer; and forming a signal wiring layer on the substrate, wherein the signal wiring layer includes a plurality of first signal transmission lines and a plurality of second signal transmission lines, the touch detection electrode is electrically coupled to a corresponding first signal transmission line and transmits a touch detection signal through the corresponding first signal transmission line, and the fingerprint recognition electrode is electrically coupled to a corresponding second signal transmission line and transmits a fingerprint recognition signal through the corresponding second signal transmission line.

In some embodiments, the signal wiring layer is formed after the plurality of touch detection units and the plurality of fingerprint recognition units are formed.

In some embodiments, the method further includes: forming a display function layer on the substrate, wherein the display function layer includes a plurality of gate lines, a plurality of data lines and a plurality of pixel units, each pixel unit corresponds to one gate line and one data line and includes a pixel driving circuit and a light emitting device, the pixel driving circuit is configured to drive the light emitting device to emit light, the pixel driving circuit includes a signal writing transistor, a gate of the signal writing transistor is coupled to the one gate line, and a first electrode of the signal writing transistor is coupled to the one data line.

In some embodiments, forming a display function layer on the substrate includes: forming the pixel driving circuit and a switching transistor simultaneously through a transistor fabricating process, wherein the fingerprint recognition electrode is electrically coupled to the corresponding second signal transmission line through the switching transistor, a gate of the switching transistor and the gate of the signal writing transistor are disposed in a same layer, an active layer of the switching transistor and an active layer of the signal writing transistor are disposed in a same layer, and first and second electrodes of the switching transistor and first and second electrodes of the signal writing transistor are disposed in a same layer; and forming the light emitting device by a light emitting device fabricating process.

Embodiments of the present disclosure also provide a display device including any one of the above touch panels.

DETAILED DESCRIPTION

In order to make one of ordinary skill in the art better understand the technical solutions of the present disclosure, a touch panel, a fabricating method thereof, and a display device provided in embodiments of the present disclosure are described in detail below with reference to the accompanying drawings.

Structures "disposed in a same layer" in the present disclosure specifically refer to structures obtained by patterning the same one or more layers of material films. "Patterning" in the present disclosure generally includes processes such as photoresist coating, exposure, development, etching, photoresist stripping, and the like.

In embodiments of the present disclosure, one of first and second electrodes of a transistor is a source of the transistor, the other of the first and second electrodes is a drain of the transistor, and a control electrode of the transistor is a gate of the transistor. In general, the source and the drain of the transistor may be interchanged.

Figure 1:
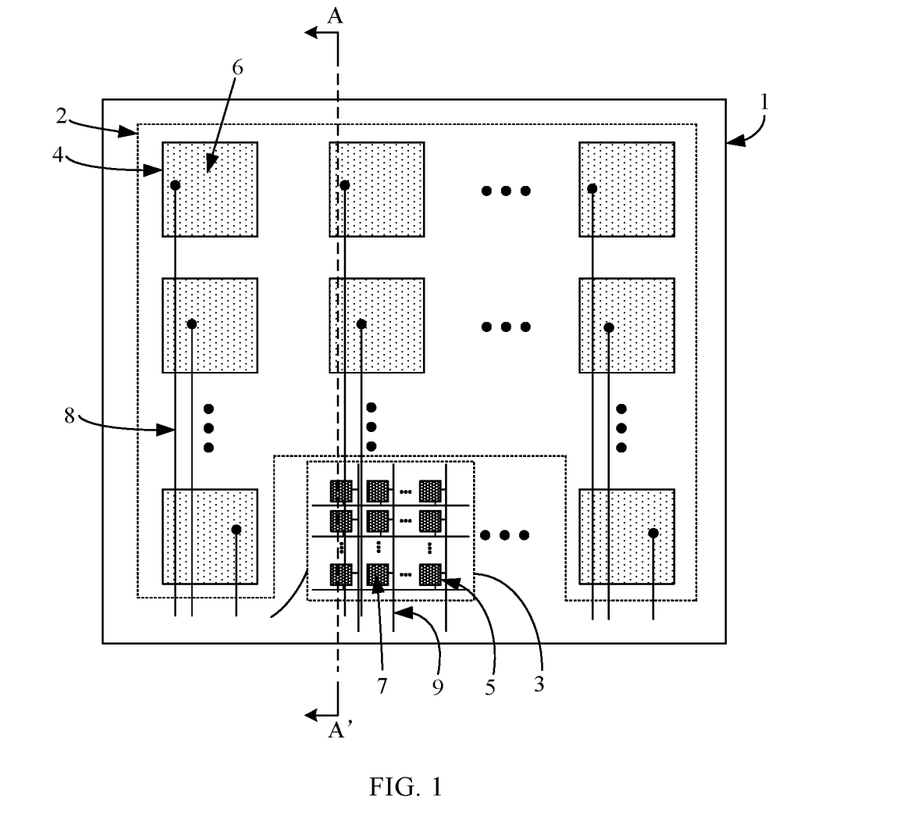
FIG. 1 is a schematic top view of a touch panel according to an embodiment of the present disclosure.
Figure 2:
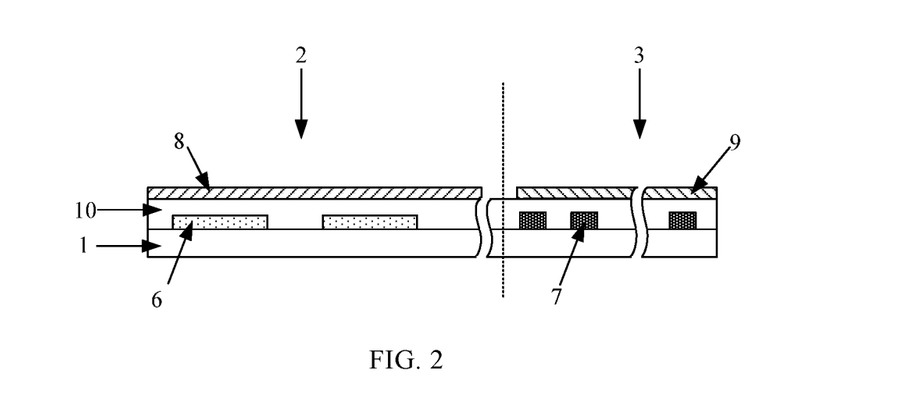
FIG. 2 is a schematic cross-sectional view taken along a line A-A' of FIG. 1.

FIG. 1 is a schematic top view of a touch panel according to an embodiment of the present disclosure, and FIG. 2 is a schematic cross-sectional view taken along a line A-A' of FIG. 1. As shown in FIGS. 1 and 2, the touch panel includes: a substrate 1, a plurality of touch detection units 4, a plurality of fingerprint recognition units 5 and a signal wiring layer. The substrate 1 includes a touch detection area 2 and a fingerprint recognition area 3, the plurality of touch detection units 4 are on the substrate 1 and in the touch detection area 2, and the plurality of fingerprint recognition units 5 are on the substrate 1 and in the fingerprint recognition area 3. Each of the touch detection units 4 includes a touch detection electrode 6, each of the fingerprint recognition units 5 includes a fingerprint recognition electrode 7, and the fingerprint recognition electrodes 7 and the touch detection electrodes 6 are disposed in the same layer. As shown in FIG. 1, the touch detection area 2 and the fingerprint recognition area 3 may not overlap each other in a plan view.

In an embodiment of the present disclosure, the signal wiring layer is on a same side of the substrate 1 as the touch detection electrodes 6 and the fingerprint recognition electrodes 7, the signal wiring layer includes a plurality of first signal transmission lines 8 and a plurality of second signal transmission lines 9, each touch detection electrode 6 is electrically coupled to a corresponding first signal transmission line 8 and transmits a touch detection signal through the corresponding first signal transmission line 8, and each fingerprint recognition electrode 7 is electrically coupled to a corresponding second signal transmission line 9 and transmits a fingerprint recognition signal through the corresponding second signal transmission line 9. In some embodiments, each touch detection electrode 6 corresponds to one first signal transmission line 8, and each fingerprint recognition electrode 7 corresponds to one second signal transmission line 9.

In an embodiment of the present disclosure, each fingerprint recognition unit 5 includes one fingerprint recognition electrode 7.

In an embodiment of the present disclosure, an insulating layer 10 is located between the layer where the touch detection electrodes 6 and the fingerprint recognition electrodes 7 are located and the signal wiring layer, vias are formed in the insulating layer 10, and the touch detection electrodes 6 and the fingerprint recognition electrodes 7 are respectively coupled to the corresponding first signal transmission lines 8 and the corresponding second signal transmission lines 9 through the vias. In an embodiment of the present disclosure, although the layer where the touch detection electrodes 6 and the fingerprint recognition electrodes 7 are located is located between the substrate 1 and the signal wiring layer, the present disclosure is not limited thereto. In some embodiments, the signal wiring layer may be located between the substrate 1 and the layer where the touch detection electrodes 6 and the fingerprint recognition electrodes 7 are located, which also falls within the scope of the present disclosure.

It should be noted that, shapes and positions of the touch detection area 2 and the fingerprint recognition area 3 shown in the accompanying drawings are only for illustration and are not limited in the present disclosure.

In some embodiments, as shown in FIG. 2, the layer where the touch detection electrodes 6 and the fingerprint recognition electrodes 7 are located is located between the substrate 1 and the signal wiring layer. In this case, when a user performs a touch operation or a fingerprint recognition operation, the distance between a touch object (e.g., a finger) or a fingerprint and a corresponding electrode is small (for example, only the substrate 1 is located between the signal wiring layer and the layer where the touch detection electrodes 6 and the fingerprint recognition electrodes 7 are located), and a coupling capacitance formed between the touch object or the fingerprint and the corresponding electrode is large, thereby facilitating subsequent touch detection and fingerprint recognition, and improving the accuracy of the touch detection and the fingerprint recognition.

It should be noted that, in the embodiments of the present disclosure, the touch detection units 4 are capacitive touch detection units 4, and the fingerprint recognition units 5 are capacitive fingerprint recognition units 5. Specific structures of the capacitive touch detection units 4 and the capacitive fingerprint recognition units 5 are not limited in the present disclosure, as long as the capacitive touch detection units 4 and the capacitive fingerprint recognition units 5 each include at least one electrode for capacitance sensing.

In the embodiments of the present disclosure, the touch detection units 4 for implementing a touch detection function and the fingerprint recognition units 5 for implementing a fingerprint recognition function are integrated on the same substrate, and the touch detection electrodes 6 of the touch detection units 4 and the fingerprint recognition electrodes 7 of the fingerprint recognition units 5 are disposed in the same layer. In addition, the first signal transmission lines 8 and the second signal transmission lines 9, which respectively provide signals for the touch detection electrodes 6 and the fingerprint recognition electrodes 7, are also disposed in the same layer. Therefore, the overall thickness of the touch panel can be effectively reduced, and the touch panel becomes thinner.

In some embodiments, as shown in FIGS. 1 and 2, the touch detection units 4 are self-capacitive touch detection units 4. Specifically, the touch detection electrode 6 in each of the touch detection units 4 is a self-capacitive touch detection electrode 6. The self-capacitive touch detection electrodes 6 are in one-to-one correspondence with the first signal transmission lines 8. A self-capacitance is formed between the self-capacitive touch detection electrode 6 and ground. When the touch object performs the touch operation, a coupling capacitance is formed between the touch object and the self-capacitive touch detection electrode 6, and the formed coupling capacitance is superimposed with the self-capacitance, so that the self-capacitance at the self-capacitive touch detection electrode 6 is increased. On this basis, by detecting the self-capacitance of each self-capacitive touch detection electrode 6, it can be determined whether the touch operation occurs at an area of the self-capacitive touch detection electrode 6 in the touch detection area 2. Since the working principle of each self-capacitive touch detection electrode 6 is known, the specific process of the detection of the self-capacitance will not be described in detail herein.

Figure 3:
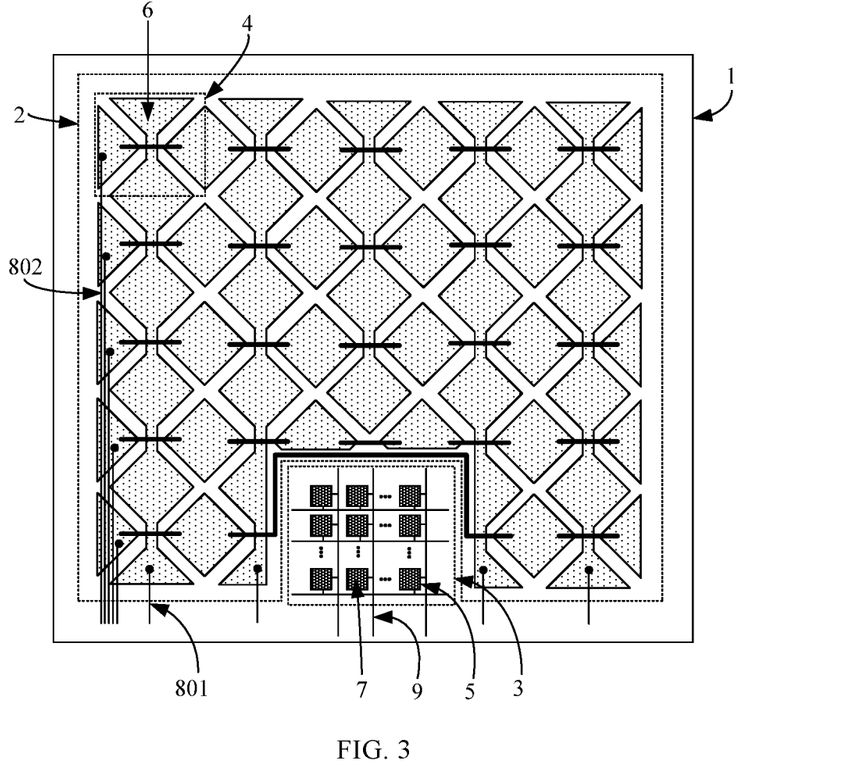
FIG. 3 is a schematic top view of a touch panel according to an embodiment of the present disclosure.
Figure 4:
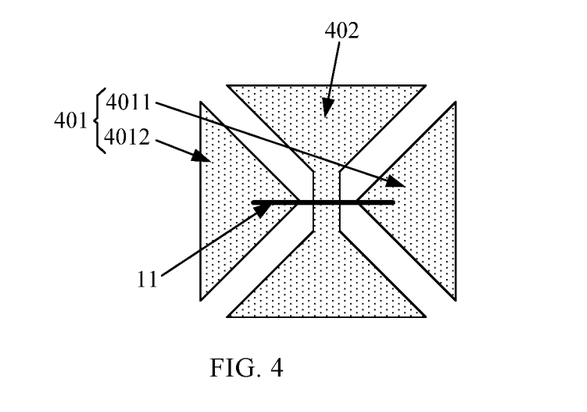
FIG. 4 is a schematic top view of one touch detection unit of the touch panel shown in FIG. 3.

FIG. 3 is a top view of a touch panel according to an embodiment of the present disclosure, and FIG. 4 is a top view of one touch detection unit of the touch panel in FIG. 3. As shown in FIGS. 3 and 4, unlike the touch panel shown in FIG. 1, the touch detection units 4 in the touch panel shown in FIG. 3 are mutual capacitive touch detection units. Specifically, the touch detection electrode 6 in each of the touch detection units 4 includes a first touch detection electrode 401 and a second touch detection electrode 402. The first touch detection electrode 401 includes a first sub-electrode 4011 and a second sub-electrode 4012 respectively on both sides of the second touch detection electrode 402, the first sub-electrode 4011 and the second sub-electrode 4012 are electrically coupled to each other through a bridge wire 11, and the bridge wire 11 is insulated from the second touch detection electrode 402. One of the first touch detection electrode 401 and the second touch detection electrode 402 is a mutual capacitive touch scanning electrode, and the other is a mutual capacitive touch sensing electrode.

The mutual capacitive touch scanning electrode and the mutual capacitive touch sensing electrode form a mutual capacitance. When the touch object (e.g., a finger) approaches the touch detection unit 4, the magnitude of the mutual capacitance formed by the mutual capacitive touch scanning electrode and the mutual capacitive touch sensing electrode in the touch detection unit 4 is changed. Therefore, by detecting the magnitude of the mutual capacitance formed by the mutual capacitive touch scanning electrode and the mutual capacitive touch sensing electrode in each touch detection unit 4, it can be determined whether the touch operation occurs at an area of the mutual capacitive touch detection unit 4 in the touch detection area 2. Since the working principle of each mutual capacitive touch detection unit 4 is known, the specific process of the detection of the mutual capacitance will not be described in detail herein.

In some embodiments, as shown in FIGS. 3 and 4, the touch detection units 4 are arranged in an array, each first touch detection electrode 401 is the mutual capacitive touch scanning electrode and each second touch detection electrode 402 is the mutual capacitive touch sensing electrode, the mutual capacitive touch scanning electrodes in a same row are electrically coupled to each other, and the mutual capacitive touch sensing electrodes in a same column are electrically coupled to each other. The first signal transmission lines 8 include a plurality of touch scanning signal transmission lines 802 and a plurality of touch sensing signal transmission lines 801. The mutual capacitive touch scanning electrodes in the same row are electrically coupled to a same touch scanning signal transmission line 802, the mutual capacitive touch scanning electrodes in different rows are electrically coupled to different touch scanning signal transmission lines, the mutual capacitive touch sensing electrodes in the same column are electrically coupled to a same touch sensing signal transmission line 801, and the mutual capacitive touch sensing electrodes in different columns are electrically coupled to different touch sensing signal transmission lines.

The mutual capacitive touch scanning electrodes in the same row share one touch scanning signal transmission line 802, and the mutual capacitive touch sensing electrodes in the same column share one touch sensing signal transmission line 801, thereby greatly reducing the number of signal lines required to be arranged in the touch panel.

In some embodiments, each bridge wire 11 is disposed in a same layer as each touch scanning signal transmission line 802 and each touch sensing signal transmission line 801. Therefore, the arrangement of the bridge wire 11 does not increase the overall thickness of the touch panel.

Figure 5:
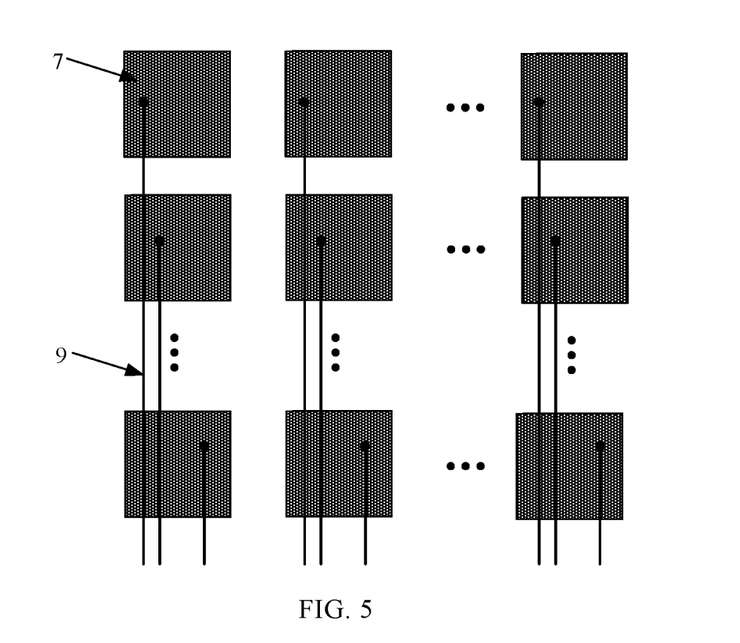
FIG. 5 is a schematic top view of a fingerprint recognition area of a touch panel according to an embodiment of the present disclosure.

FIG. 5 is a top view of a fingerprint recognition area according to an embodiment of the present disclosure. As shown in FIG. 5, the fingerprint recognition units 5 in the fingerprint recognition area 3 are self-capacitive fingerprint recognition units 5. Specifically, the fingerprint recognition electrode 7 in each of the self-capacitive fingerprint recognition units 5 is a self-capacitive fingerprint recognition electrode. The self-capacitive fingerprint recognition electrodes 7 are in one-to-one correspondence with the second signal transmission lines 9.

When a fingerprint recognition operation is performed, since a distance between a valley of a fingerprint and a self-capacitive fingerprint recognition electrode 7 is greater than a distance between a ridge of the fingerprint and the self-capacitive fingerprint recognition electrode 7, a coupling capacitance formed by the valleys and the self-capacitive fingerprint recognition electrode 7 is smaller than a coupling capacitance between the ridges and the self-capacitive fingerprint recognition electrode 7. Therefore, by detecting the magnitude of the self-capacitance of the self-capacitive fingerprint recognition electrode 7, it can be determined whether the valley or the ridge of the fingerprint is placed on an area of the self-capacitive fingerprint recognition electrode 7. Since the working principle of the self-capacitive fingerprint recognition electrode 7 is known, the specific process of the detection of the self-capacitance will not be described in detail herein.

Figure 6:
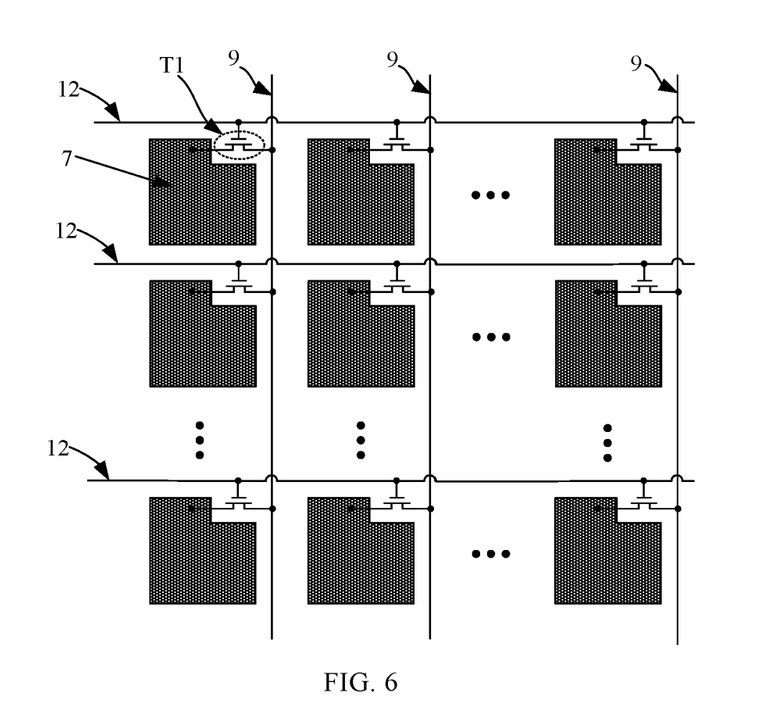
FIG. 6 is a schematic top view of a fingerprint recognition area of a touch panel according to an embodiment of the present disclosure.

FIG. 6 is a top view of a fingerprint recognition area according to an embodiment of the present disclosure. As shown in FIG. 6, unlike the self-capacitive fingerprint recognition unit 5 shown in FIG. 5, each of the self-capacitive fingerprint recognition units 5 in FIG. 6 includes not only the fingerprint recognition electrode 7 but also a switching transistor T1. As shown in FIG. 6, each fingerprint recognition electrode 7 is electrically coupled to a corresponding second signal transmission line 9 through a corresponding switching transistor T1, a control electrode of the corresponding switching transistor T1 is coupled to a fingerprint scanning driving line 12 corresponding to a corresponding fingerprint recognition unit 5, a first electrode of the corresponding switching transistor T1 is coupled to the second signal transmission line 9 corresponding to the corresponding fingerprint recognition unit 5, and a second electrode of the corresponding switching transistor T1 is coupled to the fingerprint recognition electrode 7 of the corresponding fingerprint recognition unit 5. As shown in FIG. 6, the fingerprint recognition units 5 are arranged in an array, the fingerprint recognition units 5 in a same row are coupled to a same fingerprint scanning driving line 12, the fingerprint recognition units in different rows correspond to different fingerprint scanning driving lines, the fingerprint recognition units 5 in a same column are coupled to a same second signal transmission line 9, and the fingerprint recognition units in different columns correspond to different second signal transmission lines.

In the embodiment of FIG. 5, the detection of the self-capacitances of all fingerprint recognition electrodes 7 can be performed simultaneously, and in the embodiment of FIG. 6, the detection of the self-capacitances of all fingerprint recognition electrodes 7 can be performed row by row. That is, in the embodiment of FIG. 6, a driving signal is sequentially supplied to each of the fingerprint scanning driving lines to sequentially turn on the switching transistors T1 of the self-capacitive fingerprint recognition units 5 in each row, and the self-capacitances of the fingerprint recognition electrodes 7 of the self-capacitive fingerprint recognition units 5 in each row is sequentially detected by the second signal transmission lines 9 coupled to the fingerprint recognition electrodes 7 in the row.

It is assumed that the fingerprint recognition units 5 in the fingerprint recognition area 3 are arranged in an M×N array, where each of M and N is an integer equal to or greater than 2 and (M+N)<M×N. In this case, in the embodiment of FIG. 5, M×N signal lines are required to be arranged for all the fingerprint recognition units 5; and in the embodiment of FIG. 6, (M+N) signal lines (including N second signal transmission lines and M fingerprint scanning driving lines) are required to be arranged in total for all fingerprint recognition units 5. Therefore, the embodiment of FIG. 6 can reduce the number of signal lines for implementing fingerprint recognition in the case where a resolution of fingerprint recognition remains constant.

It should be noted that the fingerprint recognition area 3 in the touch panel shown in each of FIGS. 1 and 3 may employ the structure shown in FIG. 5 or 6.

Considering that a detection accuracy of touch detection may be lower than a recognition accuracy of fingerprint recognition, in the actual design process, a size of each touch detection unit 4 may be larger than that of each fingerprint recognition unit 5, that is, a size of each touch detection electrode 6 may be larger than that of each fingerprint recognition electrode 7. In some embodiments, the size of each touch detection unit 4 may be no greater than 5 mm×5 mm, and the size of each fingerprint recognition unit 5 may be no greater than 90 µm×90 µm.

In addition, the shapes of each touch detection electrode 6 and each fingerprint recognition electrode 7 shown in the accompanying drawings are only for illustration and are not limited in the present disclosure.

Figure 7:
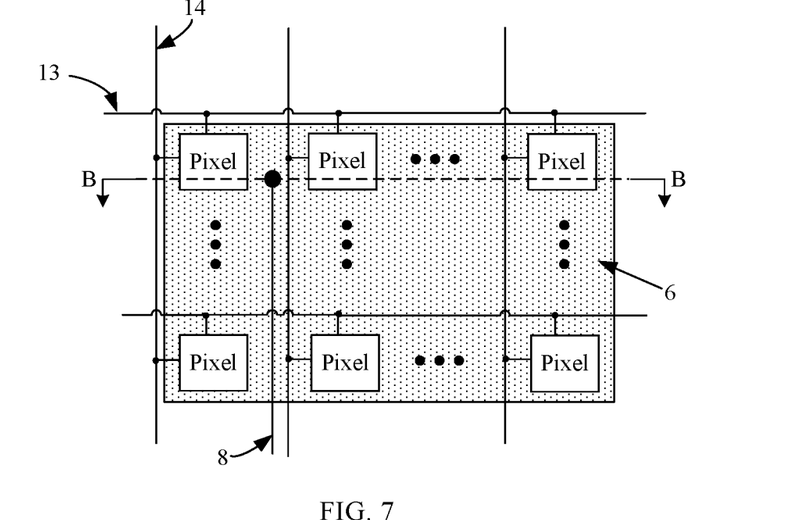
FIG. 7 is a schematic top view of one touch detection unit and pixel units within an area of the touch detection unit according to an embodiment of the present disclosure.
Figure 8:
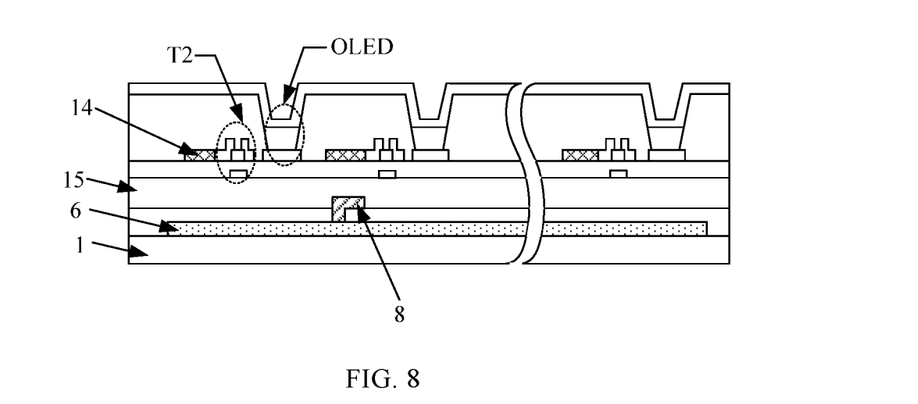
FIG. 8 is a schematic cross-sectional view taken along a line B-B' of FIG. 7.
Figure 9:
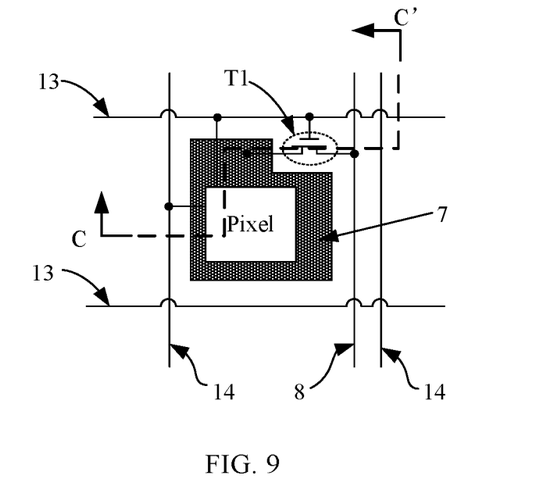
FIG. 9 illustrates a schematic top view of one fingerprint recognition unit and a pixel unit within an area of the fingerprint recognition unit according to an embodiment of the present disclosure.
Figure 10:
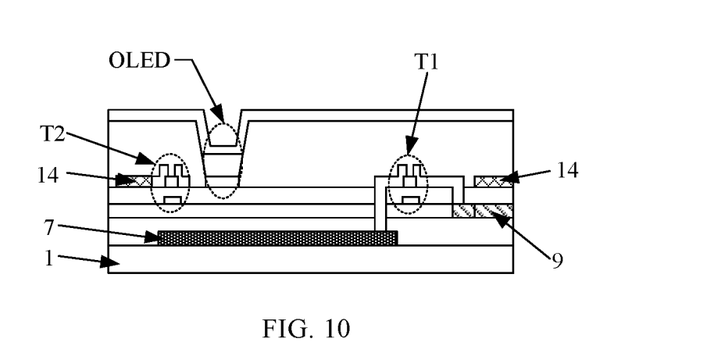
FIG. 10 is a schematic cross-sectional view taken along a line C-C' of FIG. 9.

FIG. 7 is a schematic top view illustrating one touch detection unit and pixel units within an area of the touch detection unit according to an embodiment of the present disclosure, and FIG. 8 is a schematic cross-sectional view taken along a line B-B' of FIG. 7. FIG. 9 is a schematic top view illustrating one fingerprint recognition unit and a pixel cell within an area of the fingerprint recognition unit according to an embodiment of the present disclosure, and FIG. 10 is a schematic cross-sectional view taken along a line C-C' of FIG. 9.

As shown in FIGS. 7 to 10, in some embodiments, the touch panel according to the embodiments of the present disclosure further has a display function. Specifically, the touch panel further includes a display function layer, and the touch detection electrodes 6, the fingerprint recognition electrodes 7 and the signal wiring layer are on a side of the display function layer proximal to the substrate 1.

As shown in FIGS. 7 to 10, in some embodiments, the touch detection electrodes 6 and the fingerprint recognition electrodes 7 are on a side of the signal wiring layer distal to the display function layer, and a planarization layer 15 is disposed between the display function layer and the signal wiring layer.

The display function layer includes a plurality of gate lines 13, a plurality of data lines 14 and a plurality of pixel units Pixel, and each pixel unit Pixel corresponds to one gate line 13 and one data line 14. Each pixel unit Pixel includes a pixel driving circuit and a light emitting device, and the pixel driving circuit is configured to drive the light emitting device to emit light. The pixel driving circuit includes a signal writing transistor T2, a control electrode of the signal writing transistor T2 is coupled to a corresponding gate line 13, a first electrode of the signal writing transistor T2 is coupled to a corresponding data line 14, and a second electrode of the signal writing transistor T2 is coupled to another electrical structure (not shown) in the pixel driving circuit.

A specific structure of the pixel driving circuit is not limited in the present disclosure, as long as the pixel driving circuit includes the signal writing transistor T2 configured to be coupled to the corresponding gate line 13 and the corresponding data line 14 and write a data voltage supplied from the corresponding data line 14 to the pixel driving circuit.

In the embodiments of the present disclosure, the light emitting device may be a current-driven light emitting device such as a Light Emitting Diode (LED) or an Organic Light Emitting Diode (OLED). In some embodiments, as shown in FIGS. 7 to 10, the light emitting device is an OLED. In some embodiments, the OLED is a bottom-emitting OLED, that is, light is emitted from a side of the OLED proximal to the substrate 1.

A size of each pixel unit is generally 20 µm×20 µm to 30 µm×30 µm, in consideration of a pixel resolution and difficulty of a fabricating process. In this case, one touch detection unit 4 may cover about one thousand pixel units, and one fingerprint recognition unit 5 may cover 1 to 3 pixel units.

In some embodiments, the orthographic projections of the data lines 14 on the signal wiring layer cover the first signal transmission lines 8 and the second signal transmission lines 9. In this case, the arrangement of the first signal transmission lines 8 and the second signal transmission lines 9 does not affect an aperture ratio of each pixel unit.

In some embodiments, as shown in FIGS. 9 and 10, in the case where each fingerprint recognition unit 5 is each fingerprint recognition unit 5 shown in FIG. 6, the gate of the switching transistor T1 is disposed in a same layer as the gate of the signal writing transistor T2, an active layer of the switching transistor T1 is disposed in a same layer as an active layer of the signal writing transistor T2, and the first and second electrodes of the switching transistor T1 are disposed in a same layer as the first and second electrodes of the signal writing transistor T2. In this case, the transistors (including the signal writing transistor T2) in the pixel driving circuit and the switching transistor T1 in each fingerprint recognition unit 5 may be simultaneously fabricated using a conventional transistor fabricating process. Therefore, a separate process for fabricating the switching transistor T1 is not required in the fabricating process of the touch panel, thereby shortening the fabricating period of the transistors. In addition, as described above, each portion of the switching transistor T1 is disposed in the same layer as the corresponding portion of the signal writing transistor T2, and thus the disposition of the switching transistor T1 does not result in an increase in the thickness of the touch panel.

In some embodiments, the fingerprint scanning driving line to which the control electrode of the switching transistor T1 is coupled is implemented by the gate line 13. That is, at least a part of the gate lines 13 are multiplexed as the fingerprint scanning driving lines for driving the fingerprint recognition units 5. In this case, the driving of the fingerprint recognition units 5 in the fingerprint recognition area 3 may be synchronized with the driving of the pixel units.

Figure 11:
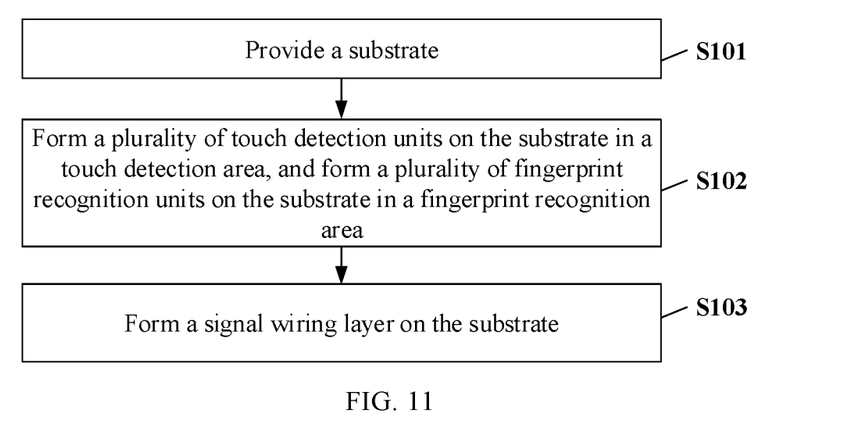
FIG. 11 is a flowchart of a method for fabricating a touch panel according to an embodiment of the present disclosure.

FIG. 11 is a flowchart of a method for fabricating a touch panel according to an embodiment of the present disclosure. The method may be used for fabricating the touch panel in the above embodiments. As shown in FIG. 11, the method may include the following steps S101 to S103.

In step S101, a substrate is provided.

The substrate may be a rigid substrate such as a glass substrate, or a flexible substrate such as a polymer material (for example, PET, PEN) substrate. The substrate includes a touch detection area and a fingerprint recognition area.

In step S102, a plurality of touch detection units are formed on the substrate in the touch detection area, and a plurality of fingerprint recognition units are formed on the substrate in the fingerprint recognition area.

Each of the touch detection units includes a touch detection electrode, each of the fingerprint recognition units includes a fingerprint recognition electrode, and the fingerprint recognition electrodes and the touch detection electrodes are disposed in a same layer.

In step S102, a conductive material film may be first formed on the substrate through a deposition process, and then be patterned to obtain the touch detection electrodes and the fingerprint recognition electrodes. In some embodiments, a conductive material contained in the conductive material film is a transparent conductive material. In some embodiments, the transparent conductive material is Indium Tin Oxide (ITO).

In step S103, a signal wiring layer is formed on the substrate.

The signal wiring layer, the touch detection electrodes and the fingerprint recognition electrodes are on a same side of the substrate, the signal wiring layer includes a plurality of first signal transmission lines and a plurality of second signal transmission lines, each touch detection electrode is electrically coupled to a corresponding first signal transmission line and transmits a touch detection signal through the corresponding first signal transmission line, and each fingerprint recognition electrode is electrically coupled to a corresponding second signal transmission line and transmits a fingerprint recognition signal through the corresponding second signal transmission line.

In the method for fabricating the touch panel according to the embodiments of the present disclosure, a sequence (i.e., an order) for performing step S102 and step S103 is not limited. In some embodiments, the touch detection electrodes and the fingerprint recognition electrodes may be fabricated before fabricating the first signal transmission lines and the second signal transmission lines. In some embodiments, the touch detection electrodes and the fingerprint recognition electrodes may be fabricated after fabricating the first signal transmission lines and the second signal transmission lines.

In the case where the touch detection electrodes and the fingerprint recognition electrodes are fabricated before fabricating the first signal transmission lines and the second signal transmission lines, after the fabricating of the touch detection electrodes and the fingerprint recognition electrodes is completed and before the fabricating of the first signal transmission lines and the second signal transmission lines is started, an insulating layer is formed on a side, distal to the substrate, of the touch detection electrodes and the fingerprint recognition electrodes, a plurality of through vias are formed in the insulating layer. The touch detection electrodes and the fingerprint recognition electrodes are electrically coupled to the corresponding first signal transmission lines and the corresponding second signal transmission lines respectively through the vias.

In some embodiments, the method further includes: forming a display function layer on the substrate. The display function layer includes a plurality of gate lines, a plurality of data lines and a plurality of pixel units, each pixel unit corresponds to one gate line and one data line and includes a pixel driving circuit and a light emitting device, the pixel driving circuit is configured to drive the light emitting device to emit light, the pixel driving circuit includes a signal writing transistor, a gate of the signal writing transistor is coupled to the corresponding gate line, a first electrode of the signal writing transistor is coupled to the corresponding data line, and a second electrode of the signal writing transistor is coupled to another electrical structure (not shown) in the pixel driving circuit.

In some embodiments, the forming a display function layer on the substrate includes: forming the pixel driving circuit and a switching transistor simultaneously by a transistor fabricating process, and forming the light emitting device by a light emitting device fabricating process. In this case, each of the fingerprint recognition electrodes is electrically coupled to the corresponding second signal transmission line through the switching transistor, the pixel driving circuit includes the signal writing transistor, a gate of the switching transistor and the gate of the signal writing transistor are disposed in a same layer, an active layer of the switching transistor and an active layer of the signal writing transistor are disposed in a same layer, and first and second electrodes of the switching transistor and first and second electrodes of the signal writing transistor are disposed in a same layer.

Each of the fingerprint recognition electrodes is electrically coupled to the corresponding second signal transmission line through the switching transistor. In some embodiments, the gate of the switching transistor is coupled to a fingerprint scanning driving line corresponding to the fingerprint recognition electrode, the first electrode of the switching transistor is coupled to the second signal transmission line corresponding to the fingerprint recognition electrode, and the second electrode of the switching transistor is coupled to the fingerprint recognition electrode.

Figure 12:
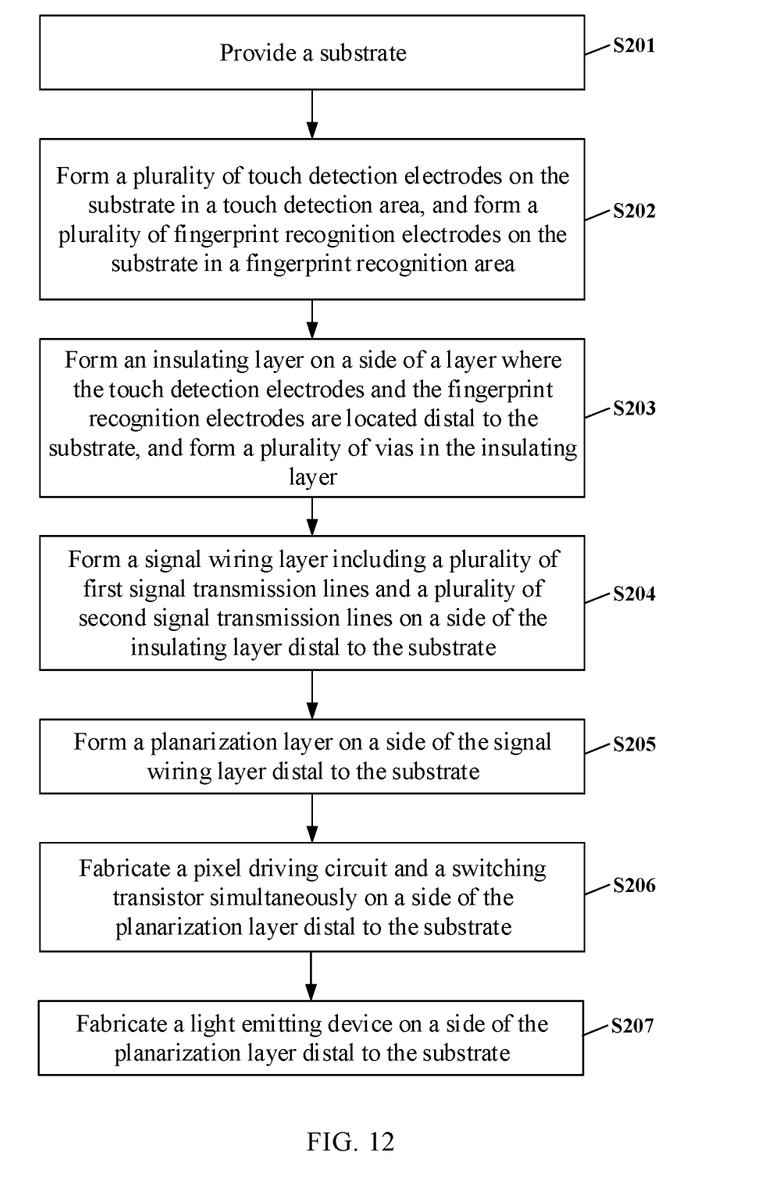
FIG. 12 is a flowchart of a method for fabricating a touch panel according to an embodiment of the present disclosure.

FIG. 12 is a flowchart of a method for fabricating a touch panel according to an embodiment of the present disclosure. The method includes: forming a display function layer on a substrate, forming an insulating layer and vias therein, and forming a planarization layer. The method may be used for fabricating the touch panel in any one of the above embodiments. As shown in FIG. 12, the method may include the following steps S201 to S207.

In step S201, a substrate is provided.

In step S202, a plurality of touch detection electrodes are formed on the substrate in a touch detection area, and a plurality of fingerprint recognition electrodes are formed on the substrate in a fingerprint recognition area.

The fingerprint recognition electrodes and the touch detection electrodes are disposed in a same layer.

In step S203, an insulating layer is formed on a side of a layer where the touch detection electrodes and the fingerprint recognition electrodes are located distal to the substrate, and a plurality of vias are formed in the insulating layer.

In step S204, a signal wiring layer including a plurality of first signal transmission lines and a plurality of second signal transmission lines is formed on a side of the insulating layer distal to the substrate. Each touch detection electrode is coupled to a corresponding first signal transmission line through a corresponding via, and each fingerprint recognition electrode is coupled to a corresponding second signal transmission line through a corresponding via.

In some embodiments, as shown in FIG. 3, each of the touch detection electrodes includes a first touch detection electrode and a second touch detection electrode, the first touch detection electrode includes a first sub-electrode and a second sub-electrode respectively on both sides of the second touch detection electrode, and the first sub-electrode and the second sub-electrode are electrically coupled to each other through a bridge wire. In this case, in step S204, the first signal transmission lines and the second signal transmission lines may be formed simultaneously with the forming of bridge wires, and each bridge wire is coupled to corresponding first and second sub-electrodes through corresponding vias that have been formed in the insulating layer.

In step S205, a planarization layer is formed on a side of the signal wiring layer distal to the substrate.

In step S206, a pixel driving circuit and a switching transistor are simultaneously fabricated on a side of the planarization layer distal to the substrate by a transistor fabricating process.

The pixel driving circuit includes a signal writing transistor, a gate of the switching transistor and a gate of the signal writing transistor are disposed in a same layer, an active layer of the switching transistor and an active layer of the signal writing transistor are disposed in a same layer, and first and second electrodes of the switching transistor and first and second electrodes of the signal writing transistor are disposed in a same layer.

Each of the fingerprint recognition electrodes is electrically coupled to the corresponding second signal transmission line through the switching transistor. In some embodiments, the gate of the switching transistor is coupled to a fingerprint scanning driving line corresponding to the fingerprint recognition electrode, the first electrode of the switching transistor is coupled to the second signal transmission line corresponding to the fingerprint recognition electrode, and the second electrode of the switching transistor is coupled to the fingerprint recognition electrode.

It should be noted that the transistor fabricating process is a conventional process in the art and therefore will not be described in detail herein. In the process of fabricating the pixel driving circuit and the switching transistor, a gate line may be formed simultaneously with the forming of the gates of the signal writing transistor and the switching transistor, and a data line may be formed simultaneously with the forming of the sources and drains of the signal writing transistor and the switching transistor. The gate of the signal writing transistor is coupled to the gate line, the first electrode of the signal writing transistor is coupled to the data line, and the second electrode of the signal writing transistor is coupled to another electrical structure (not shown) in the pixel driving circuit.

To reduce the number of signal lines in the touch panel, the gate of the switching transistor may be coupled to the gate line. That is, at least a portion of the gate line also serves as the fingerprint scanning driving line for driving the fingerprint recognition electrode.

In step S207, a light emitting device is fabricated on a side of the planarization layer distal to the substrate by a light emitting device fabricating process (e.g., a process for fabricating an OLED).

The light emitting device is coupled to the pixel driving circuit which may be configured to supply a driving current to the light emitting device.

By the above method for fabricating a touch panel, a touch panel with touch detection, fingerprint recognition and display functions can be fabricated, and the touch panel can be lighter and thinner.

An embodiment of the present disclosure also provides a display device including the touch panel according to the embodiments of the present disclosure.

The display device according to an embodiment of the present disclosure may include any product or component with a display function, such as electronic paper, an OLED panel, a mobile phone, a tablet computer, a television, a display, a notebook computer, a digital photo frame, a navigator, or the like.

It will be appreciated that the above embodiments are merely exemplary embodiments for the purpose of illustrating the principle of the present disclosure, and the present disclosure is not limited thereto. Various modifications and improvements can be made by one of ordinary skill in the art without departing from the spirit and essence of the present disclosure. Accordingly, all of the modifications and improvements also fall into the protection scope of the present disclosure.

What is claimed is:

1. A touch panel, comprising:
 a substrate comprising a touch detection area and a fingerprint recognition area;
 a plurality of touch detection units on the substrate and in the touch detection area, each touch detection unit comprising a touch detection electrode;
 a plurality of fingerprint recognition units on the substrate and in the fingerprint recognition area, each fingerprint recognition unit comprising a fingerprint recognition electrode, and the fingerprint recognition electrode and the touch detection electrode being in a same layer;
 a signal wiring layer on a same side of the substrate as the touch detection electrode and the fingerprint recognition electrode, and comprising a plurality of first signal transmission lines and a plurality of second signal transmission lines, wherein the touch detection electrode is electrically coupled to a corresponding first signal transmission line and transmits a touch detection signal through the corresponding first signal transmission line;

the fingerprint recognition electrode is electrically coupled to a corresponding second signal transmission line and transmits a fingerprint recognition signal through the corresponding second signal transmission line, and the touch panel further comprises a display function layer, wherein the touch detection electrode, the fingerprint recognition electrode and the signal wiring layer are on a side of the display function layer proximal to the substrate; and the display function layer comprises a plurality of gate lines, a plurality of data lines and a plurality of pixel units, each pixel unit corresponds to one gate line and one data line and comprises a pixel driving circuit and a light emitting device, the pixel driving circuit is configured to drive the light emitting device to emit light, the pixel driving circuit comprises a signal writing transistor, a gate of the signal writing transistor is coupled to the one gate line, and a first electrode of the signal writing transistor is coupled to the one data line.

2. The touch panel according to claim 1, wherein the touch detection electrode in each of the plurality of touch detection units is a self-capacitive touch detection electrode; and self-capacitive touch detection electrodes in the plurality of touch detection units are in one-to-one correspondence with the plurality of first signal transmission lines.

3. The touch panel according to claim 1, wherein the touch detection electrode in each of the plurality of touch detection units comprises a first touch detection electrode and a second touch detection electrode;

the first touch detection electrode comprises a first sub-electrode and a second sub-electrode respectively on both sides of the second touch detection electrode, the first sub-electrode and the second sub-electrode are electrically coupled to each other through a bridge wire, and the bridge wire is insulated from the second touch detection electrode; and one of the first touch detection electrode and the second touch detection electrode is a mutual capacitive touch scanning electrode, and the other of the first touch detection electrode and the second touch detection electrode is a mutual capacitive touch sensing electrode.

4. The touch panel according to claim 3, wherein the plurality of touch detection units are arranged in an array, mutual capacitive touch scanning electrodes in a same row are electrically coupled to each other, and mutual capacitive touch sensing electrodes in a same column are electrically coupled to each other;

the plurality of first signal transmission lines comprise a plurality of touch scanning signal transmission lines and a plurality of touch sensing signal transmission lines, the mutual capacitive touch scanning electrodes in the same row are electrically coupled to a same touch scanning signal transmission line, the mutual capacitive touch scanning electrodes in different rows are electrically coupled to different touch scanning signal transmission lines, the mutual capacitive touch sensing electrodes in the same column are electrically coupled to a same touch sensing signal transmission line, and the mutual capacitive touch sensing electrodes in different columns are electrically coupled to different touch sensing signal transmission lines.

5. The touch panel according to claim 4, wherein the bridge wire, the plurality of touch scanning signal transmission lines, and the plurality of touch sensing signal transmission lines are in a same layer.

6. The touch panel according to claim 1, wherein the fingerprint recognition electrode in each of the plurality of fingerprint recognition units is a self-capacitive fingerprint recognition electrode; and self-capacitive fingerprint recognition electrodes in the plurality of fingerprint recognition units are in one-to-one correspondence with the plurality of second signal transmission lines.

7. The touch panel according to claim 1, wherein each fingerprint recognition unit further comprises a switching transistor;

in the fingerprint recognition unit, the fingerprint recognition electrode is electrically coupled to the corresponding second signal transmission line through the switching transistor, a gate of the switching transistor is coupled to a fingerprint scanning driving line corresponding to the fingerprint recognition electrode, a first electrode of the switching transistor is coupled to the second signal transmission line corresponding to the fingerprint recognition electrode, and a second electrode of the switching transistor is coupled to the fingerprint recognition electrode; and the plurality of fingerprint recognition units are arranged in an array, fingerprint recognition electrodes in a same row correspond to a same fingerprint scanning driving line, fingerprint recognition electrodes in different rows correspond to different fingerprint scanning driving lines, fingerprint recognition electrodes in a same column correspond to a same second signal transmission line, and fingerprint recognition electrodes in different columns correspond to different second signal transmission lines.

8. The touch panel according to claim 1, wherein orthographic projections of the plurality of data lines on the signal wiring layer cover the plurality of first signal transmission lines and the plurality of second signal transmission lines.

9. The touch panel according to claim 1, wherein each fingerprint recognition unit further comprises a switching transistor;

in the fingerprint recognition unit, the fingerprint recognition electrode is electrically coupled to the corresponding second signal transmission line through the switching transistor, a gate of the switching transistor is coupled to a fingerprint scanning driving line corresponding to the fingerprint recognition electrode, a first electrode of the switching transistor is coupled to the second signal transmission line corresponding to the fingerprint recognition electrode, and a second electrode of the switching transistor is coupled to the fingerprint recognition electrode;

the plurality of fingerprint recognition units are arranged in an array, fingerprint recognition electrodes in a same row correspond to a same fingerprint scanning driving line, fingerprint recognition electrodes in different rows correspond to different fingerprint scanning driving lines, fingerprint recognition electrodes in a same column correspond to a same second signal transmission line, and fingerprint recognition electrodes in different columns correspond to different second signal transmission lines; and the gate of the switching transistor and the gate of the signal writing transistor are in a same layer, an active layer of the switching transistor and an active layer of the signal writing transistor are in a same layer, and the first and second electrodes of the switching transistor and the first and second electrodes of the signal writing transistor are in a same layer.

10. The touch panel according to claim 9, wherein the fingerprint scanning driving lines corresponding to the fingerprint recognition electrodes of the plurality of fingerprint recognition units are implemented by at least a part of the plurality of gate lines.

11. The touch panel according to claim 1, wherein a planarization layer is disposed between the display function layer and the signal wiring layer.

12. The touch panel according to claim 1, wherein the light emitting device comprises a current-driven light emitting device.

13. The touch panel according to claim 1, wherein the signal wiring layer is on a side of a layer where the touch detection electrode and the fingerprint recognition electrode are located distal to the substrate.

14. The touch panel according to claim 1, wherein a size of the touch detection electrode is larger than a size of the fingerprint recognition electrode.

15. A method for fabricating a touch panel, comprising:
providing a substrate, wherein the substrate comprises a touch detection area and a fingerprint recognition area;
forming a plurality of touch detection units on the substrate in the touch detection area, and forming a plurality of fingerprint recognition units on the substrate in the fingerprint recognition area, wherein each of the plurality of touch detection units comprises a touch detection electrode, each of the plurality of fingerprint recognition units comprises a fingerprint recognition electrode, and the fingerprint recognition electrode and the touch detection electrode are disposed in a same layer;
forming a signal wiring layer on the substrate, wherein the signal wiring layer comprises a plurality of first signal transmission lines and a plurality of second signal transmission lines, the touch detection electrode is electrically coupled to a corresponding first signal transmission line and transmits a touch detection signal through the corresponding first signal transmission line, and the fingerprint recognition electrode is electrically coupled to a corresponding second signal transmission line and transmits a fingerprint recognition signal through the corresponding second signal transmission line; and forming a display function layer on the substrate, wherein the touch detection electrode, the fingerprint recognition electrode and the signal wiring layer are on a side of the display function layer proximal to the substrate; and the display function layer comprises a plurality of gate lines, a plurality of data lines and a plurality of pixel units, each pixel unit corresponds to one gate line and one data line and comprises a pixel driving circuit and a light emitting device, the pixel driving circuit is configured to drive the light emitting device to emit light, the pixel driving circuit comprises a signal writing transistor, a gate of the signal writing transistor is coupled to the one gate line, and a first electrode of the signal writing transistor is coupled to the one data line.

16. The method according to claim 15, wherein the signal wiring layer is formed after the plurality of touch detection units and the plurality of fingerprint recognition units are formed.

17. The method according to claim 15, wherein forming a display function layer on the substrate comprises:
forming the pixel driving circuit and a switching transistor simultaneously through a transistor fabricating process, wherein the fingerprint recognition electrode is electrically coupled to the corresponding second signal transmission line through the switching transistor, a gate of the switching transistor and the gate of the signal writing transistor are disposed in a same layer, an active layer of the switching transistor and an active layer of the signal writing transistor are disposed in a same layer, and first and second electrodes of the switching transistor and first and second electrodes of the signal writing transistor are disposed in a same layer; and
forming the light emitting device by a light emitting device fabricating process.

18. A display device, comprising the touch panel according to claim 1.

* * * * *